United States Patent [19]

Ferdinand et al.

[11] 4,413,374
[45] Nov. 8, 1983

[54] THREE PIECE KNOB ASSEMBLY INCLUDING A CAP

[75] Inventors: Irwin J. Ferdinand, Glencoe; Richard Sylvan, Glenview; Michael Peterson, Evanston, all of Ill.

[73] Assignee: Hirsh Company, Skokie, Ill.

[21] Appl. No.: 273,203

[22] Filed: Jun. 12, 1981

[51] Int. Cl.³ .............................................. A47G 3/00
[52] U.S. Cl. ...................................... 16/121; 411/373
[58] Field of Search ......... 16/121, 122, 123, DIG. 30, 16/DIG. 40; 411/372, 373, 374, 375, 376, 377

[56] References Cited

U.S. PATENT DOCUMENTS

| | | | |
|---|---|---|---|
| 841,284 | 1/1907 | Tower | 16/121 |
| 1,400,531 | 12/1921 | Dodds | 411/374 |
| 4,136,598 | 1/1979 | Hughes | 411/372 |

FOREIGN PATENT DOCUMENTS

| | | | |
|---|---|---|---|
| 1050037 | 2/1959 | Fed. Rep. of Germany | 411/373 |
| 1561972 | 3/1980 | United Kingdom | 16/121 |

*Primary Examiner*—Fred Silverberg
*Attorney, Agent, or Firm*—Dressler, Goldsmith, Shore

[57] ABSTRACT

A two-piece knob assembly is provided for positively holding a fastener in a non-rotatable condition. The assembly includes a knob that has an aperture with varying diameters and configurations. A fastener is received in the aperture and is non-rotatably held therein due to the mating irregular configurations of the knob and the fastener. A cap is also received in the aperture to prevent the fastener from becoming dislodged in a vertical direction.

5 Claims, 4 Drawing Figures

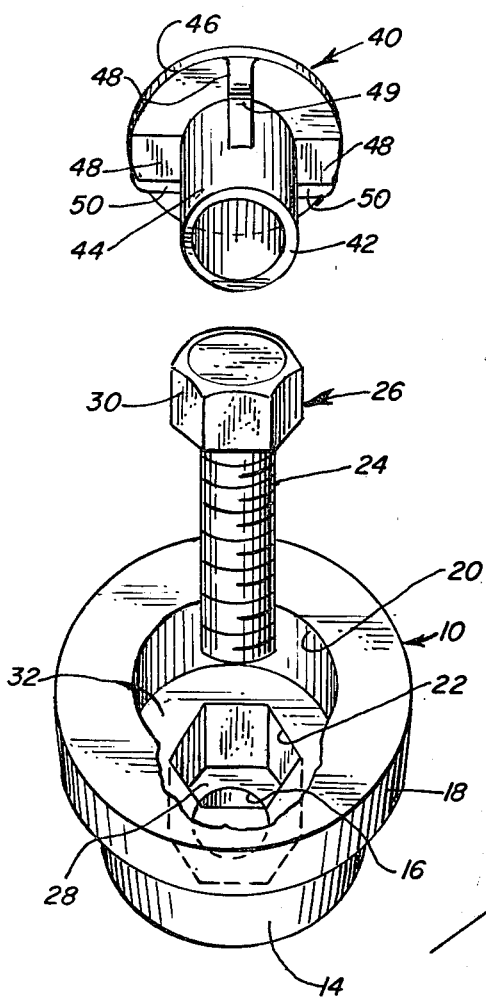
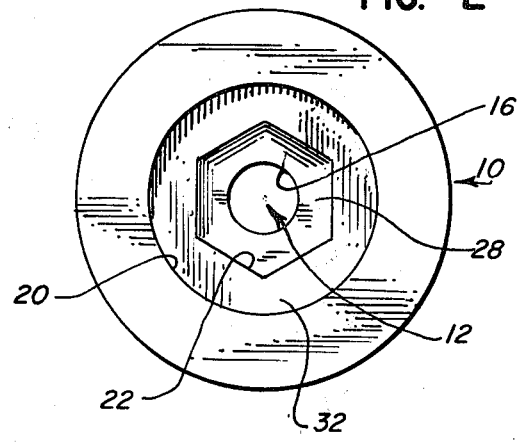
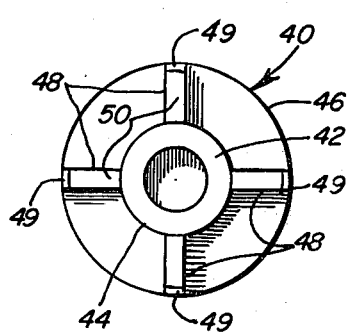
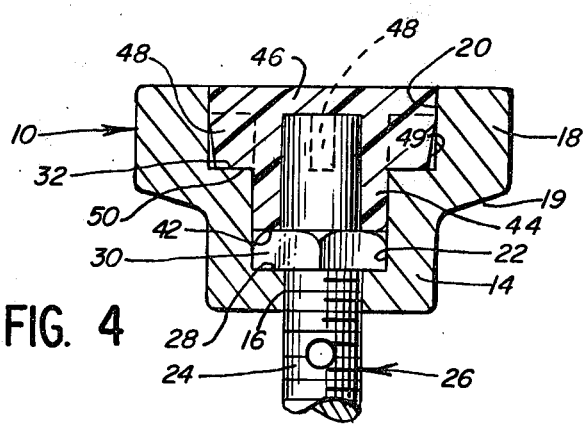

THREE PIECE KNOB ASSEMBLY INCLUDING A CAP

TECHNICAL FIELD OF THE INVENTION

The present invention relates to knobs and, more particularly, to a two-piece knob assembly which provides positive holding of a screw or nut in position within the knob assembly.

BACKGROUND OF THE INVENTION

It is desirable to provide a knob assembly which can be quickly and easily assembled and which will positively hold a fastener in a non-rotatable condition within the knob assembly.

SUMMARY OF THE INVENTION

In the preferred form of the present invention, a knob assembly is provided and comprises a knob, a bolt mounted within said knob, and a cap secured to the knob for retaining said bolt within said knob and fixed against movement relative to the knob.

In particular, the knob has a generally cylindrical bottom end and a generally cylindrical top end. Centrally defined within the knob is an aperture for receiving the bolt. The aperture includes a bottom or first bore, an intermediate portion of the aperture above the first bore and communicating with the first bore, and an upper or second bore above the intermediate portion of the aperture and communicating with the intermediate portion of the aperture.

The intermediate portion of the aperture has a generally hexagonal configuration and has a cross-sectional dimension that is larger than the diameter of the first bore so as to define a seat or seat portions around the first bore. The intermediate portion is thus adapted to receive a hexagonal nut or the hexagonal head of a bolt positioned on the seat and to prevent rotation of the bolt head. The threaded shaft of the bolt projects downwardly through the bottom or first aperture in the lower end of the knob.

A cap is provided for holding the bolt within the knob. Specifically, the cap includes a generally cylindrical bottom or lower end portion and a generally disc-like upper top end portion or flange having a diameter larger than that of the cylindrical lower end portion. The cylindrical lower end portion of the cap is disposed within the hexagonally-shaped intermediate portion of the aperture and engages the bolt head to prevent the bolt from rising off of the seat in the knob. The upper end of the cap is received within the second bore of the knob. The knob is suitably secured, as with glue or by ultrasonic welding, to the knob to thereby hold the bolt in fixed position within the knob.

BRIEF DESCRIPTION OF THE DRAWING

FIG. 1 is an exploded perspective view of the knob assembly of the present invention partially cut away to show interior detail;

FIG. 2 is a top plan view of the knob;

FIG. 3 is a bottom plan view of the cap; and

FIG. 4 is a fragmentary, cross-sectional view of the knob assembly in the fully assembled condition.

DESCRIPTION OF THE PREFERRED EMBODIMENT

While this invention is susceptible of embodiment in many different forms, there is shown in the drawing and described herein in detail a preferred embodiment of the invention, with the understanding that the present disclosure is to be considered as an exemplification of the principles of the present invention and is not intended to limit the invention to the embodiment illustrated.

The two-piece knob assembly of the present invention includes two main elements as best illustrated in the exploded view of FIG. 1 and in the cross-sectional view of the assembly in FIG. 4. In particular, the elements include a knob 10 and a cap 40 that cooperate to receive and engage a nut means such as a nut or bolt 26.

The knob 10 includes a generally cylindrical bottom end 14, a generally cylindrical top end 18 of increased diameter, and a frustoconical portion 19 (FIG. 4 only) joining the bottom end 14 with the top end 18.

The knob 10 has a central aperture 12 (FIG. 2) comprising a pair of bores 16 and 20 arranged on a common longitudinal axis. Specifically, the bottom end 14 of the knob 10 defines the bore 16 which can be characterized as a lower, bottom, or first bore and which has a predetermined diameter. The upper or top end 18 of the knob 10 defines the bore 20 which can be characterized as an upper, top, or second bore and which has a predetermined diameter larger than the diameter of the first bore 16.

Disposed longitudinally between the first and second bores 16 and 20 is an intermediate aperture portion or cavity 22 having a minimum cross-sectional dimension that is greater than the diameter of the first bore 16. As shown in FIGS. 1 and 2, the inside surface of the knob 10 that defines the intermediate aperture portion 22 preferably has a generally hexagonal configuration adapted to receive in mating engagement the head of a conventional machine screw or bolt 26. To this end, in the preferred embodiment as illustrated in the figures, the bolt 26 has a conventional hexagonal head 30 that is slightly smaller than the corresponding hexagonal cavity or intermediate aperture portion 22 in which the head 30 is received.

The hexagonal cavity 22 of the knob 10 terminates at a lower end defined by a seating surface 28 upon which the nut means, such as the bolt head 30, is disposed.

It is the function of the cavity 22 to restrain the nut means or bolt head 30 against rotation. Thus, the shape of the internal cavity or intermediate aperture portion 22 need not be the specific hexagonal configuration illustrated. For a given nut means or bolt head 30, a variety of configurations for the cavity 22 may be provided to effectively prevent rotation of the nut means or bolt head 30.

The intermediate aperture portion or cavity 22 communicates at its upper end with the top, upper, or second bore 20. In the preferred embodiment, the second bore 20 has a diameter that is larger than at least the smallest cross-sectional dimension of the intermediate portion 22. In the preferred embodiment illustrated in the figures, the diameter of the second or top bore 20 is larger than a circle defined by the vertices of the angles of hexagonal cavity configuration. Thus, a shoulder 32 is defined by a generally circular outer periphery and by a generally hexagonal interior periphery.

As best illustrated in FIGS. 1 and 4, the bolt 26 includes a stem or threaded shaft portion 24 projecting from the bolt head 30. The threaded shaft 24 is accommodated in the bottom or first bore 16 and projects therethrough from the bottom of the knob 10.

The cap 40 of the knob assembly is adapted to be received within the knob 10 over the nut means or bolt head 30. Specifically, the cap 40 is adapted to be received in the top or second bore 20 and partially within the intermediate aperture portion or cavity 22. To this end, the cap 40 has a generally hollow cylindrical lower end 44 receivable in the intermediate aperture portion 22 above the bolt head 30. Therefore, the cap lower end 44 has an outside diameter that is no greater than, and that is effectively just slightly less than, the minimum cross-sectional dimension of the intermediate aperture portion 22. The cylindrical lower end 44 terminates in a downwardly facing bottom surface 42 adapted to rest upon or engage the top surface of the bolt head 30.

The cap 40 also includes a generally disc-like top end or circular flange 46 that has a diameter greater than the diameter of the cylindrical lower end 44. The cap 40 includes a plurality of circumferentially spaced, outwardly radiating walls 48 that extend downwardly from the flange or top end 46 and outwardly from the cylindrical lower end 44. Preferably, the walls 48 extend radially outwardly from the cylindrical lower end 44 no further than the flange 46.

As best shown in FIG. 4, each wall 48 has an outer circumferental outside surface 49 that is preferably tapered inwardly toward the cap longitudinal axis with increasing distance from the top flange 46. The taper on the walls 48 functions to accommodate insertion of the cap 40 into the knob 10 during assembly and fabrication of the knob assembly. Each wall 48 also has a downwardly facing bearing surface 50 extending from the tapered surface 49 to the cylindrical lower end 44.

When fully assembled as illustrated in FIG. 4, the bottom surface 42 of the cap 40 engages the bolt head 30 and the exterior top surface of the cap top flange 46 is generally flush with the peripheral top surface of the knob top end 18. Further, the bottom surfaces 50 of the cap walls 48 engage, and are supported by, the knob shoulder 32.

The cap 40 is preferably hollow as illustrated to reduce the amount, and cost, of material that is required for fabrication. The top flange 46 of the cap 40 may be provided with an outside diameter that is equal to or just slightly greater than the diameter of the upper bore 20 for securing the cap 40 to the knob 10 by means of frictional engagement therebetween. Conventional ultrasonic welding may also be employed for fusing the cap 40 to the knob 10. Other conventional expedients, such as glue, could also be used for securing the cap to the knob.

In the assembled condition, with the cap 40 secured to the knob 10, the bolt 26 is retained in position within the knob assembly. The mating irregular shapes of the bolt head 30 and the cavity 22 of the aperture 12 causes the bolt 26 to be restrained against rotation in the knob 10. The cap 40 prevents the bolt 26 from becoming dislodged and moving upwardly.

The knob assembly is adapted to receive conventional screws or nuts in an alternate embodiment. Though not illustrated, a separate nut and screw could be used if desired. For example, a nut would first be positioned in the knob and the cap would then be disposed in the knob to retain the nut therein. A separate threaded rod or bolt could then be inserted into the knob assembly from the bottom end, with the threaded rod extending through the bottom bore of the aperture and being received in the threaded nut.

Both the knob and the cap can be formed of high impact polystyrene, such as acrylonitrile-butadiene-styrene, or other suitable materials.

From the foregoing, it will be seen that numerous variations and modifications may be effected without departing from the true spirit and scope of the novel concept of the invention. It is to be understood that no limitation with respect to the specific assembly illustrated herein is intended or should be inferred. It is, of course, intended to cover by the appended claims all such modifications that fall within the scope of the claims.

What is claimed is:

1. A knob assembly comprising a knob having a top end and a bottom end, said knob defining an aperture including a first bore in said bottom end and including a second bore in said top end, said knob defining a seat around the upper end of said first bore and a shoulder around the lower end of said second bore;

said knob having an intermediate interior surface with a non-circular configuration defining an intermediate portion of said aperture connecting said first and second bores, said knob intermediate interior surface terminating at one end along the inner periphery of said shoulder and at the other end along the outer periphery of said seat;

nut means for mounting the knob assembly and having a configuration corresponding to, and disposed in, said intermediate aperture portion of said knob against said seat to prevent relative rotation between said knob and said nut means;

a cap having a cylindrical top end received in said second bore, said cap having a cylindrical bottom end with a bottom surface extending into said intermediate aperture portion for being positioned above said nut means in said intermediate aperture portion, said cap cylindrical bottom end having an outside diameter not exceeding the smallest cross-sectional dimension of said intermediate aperture portion, said cap top end defining a flange having an outside diameter about equal to that of said second bore, said cap further including a plurality of walls extending radially outwardly and depending from said cap flange, each said wall defining a bearing surface, said cap being disposed in said knob with said bottom surface of said cap bottom end engaging said nut means in said intermediate aperture portion and with said cap flange positioned in said second bore with said depending wall bearing surfaces supported on said shoulder; and means for securing said cap to said knob whereby said cap positively holds said nut means in position within said knob.

2. A knob assembly as defined in claim 1 wherein said intermediate aperture portion has a generally hexagonal configuration and the side surfaces of said nut means define a generally hexagonal configuration.

3. A knob assembly as defined in claim 1 wherein said walls each have a tapered outside surface to accommodate insertion of said cap into said second bore.

4. A knob assembly as defined in claim 1 wherein said means for securing said cap to said knob includes frictional engagement between said cap and said knob.

5. A knob assembly as defined in claim 1 wherein weld means is provided for securing said cap to said knob.

* * * * *